(12) United States Patent  (10) Patent No.: US 9,052,859 B2
Manchala  (45) Date of Patent: Jun. 9, 2015

(54) GATHERING ANALYTIC DATA USING PRINT DRIVERS

(71) Applicant: Xerox Corporation, Norwalk, CT (US)

(72) Inventor: Daniel W. Manchala, Torrance, CA (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/788,634

(22) Filed: Mar. 7, 2013

(65) Prior Publication Data

US 2014/0253934 A1  Sep. 11, 2014

(51) Int. Cl.
 *G06F 3/12* (2006.01)
 *G06Q 10/06* (2012.01)

(52) U.S. Cl.
 CPC ............ *G06F 3/1273* (2013.01); *G06F 3/1203* (2013.01); *G06F 3/1288* (2013.01); *G06Q 10/06* (2013.01)

(58) Field of Classification Search
 CPC ... G06F 3/1204; G06F 3/1205; G06F 3/1225; G06F 3/1228; G06F 3/1245; G06F 3/126; G06F 3/1285
 See application file for complete search history.

(56) References Cited

U.S. PATENT DOCUMENTS

| | | |
|---|---|---|
| 5,580,177 A | 12/1996 | Gase et al. |
| 6,032,004 A | 2/2000 | Mirabella, Jr. et al. |
| 7,190,478 B2 | 3/2007 | Caffary, Jr. et al. |
| 7,474,433 B2 | 1/2009 | Snyder |
| 7,872,772 B2 | 1/2011 | Caffary, Jr. |
| 7,894,092 B2 | 2/2011 | Kasai et al. |
| 7,969,603 B2 | 6/2011 | Snyder |
| 2002/0067504 A1 | 6/2002 | Salgado et al. |
| 2005/0024673 A1* | 2/2005 | Sakai ........................... 358/1.14 |
| 2006/0274395 A1 | 12/2006 | Harris et al. |
| 2008/0130050 A1* | 6/2008 | Tamai et al. ................. 358/1.15 |
| 2009/0262392 A1* | 10/2009 | Tanaka ......................... 358/1.15 |
| 2009/0307760 A1* | 12/2009 | Yoshimura ....................... 726/4 |
| 2010/0202014 A1* | 8/2010 | Matsuyama ................. 358/1.15 |
| 2011/0075207 A1* | 3/2011 | Nakata ........................ 358/1.15 |
| 2011/0119104 A1 | 5/2011 | Levine et al. |
| 2011/0258631 A1* | 10/2011 | Ohashi ......................... 718/102 |

FOREIGN PATENT DOCUMENTS

EP  2365429  9/2011

* cited by examiner

*Primary Examiner* — Ashish K Thomas
*Assistant Examiner* — Idowu O Osifade
(74) *Attorney, Agent, or Firm* — Gibb & Riley, LLC

(57) ABSTRACT

Methods and systems use print drivers to automatically record identifications (IDs) of the computerized devices and applications that provided different printable items to the print drivers. The methods and systems automatically send the IDs of the computerized devices and applications that provided the different printable items to an analytics engine. The methods herein automatically produce metrics based the computerized devices and applications used to generate the different printable items using the analytics engine.

20 Claims, 6 Drawing Sheets

GATHERING ANALYTIC DATA USING PRINT DRIVERS

BACKGROUND

Systems and methods herein generally relate to printing devices and printing systems, and more particularly to methods and systems that use the print driver to analyze and change the printing process.

When a document is submitted for printing, a print driver converts it into a print ready format, before sending it to the printer. The print controller does other processing on the document specified by the print ticket. However, several pieces of printing data such as application type and version, operating system and version, format conversion time, device the document originated from, etc., are available for captured for analytics purposes, but may not be captured.

SUMMARY

Exemplary methods herein begin by receiving, into one or more computerized devices, instructions to print one or more different printable items. The methods herein automatically activate one or more print drivers on the computerized devices in response to the instructions to print the different printable items, automatically process the different printable items into print-ready format files using the print driver, and automatically provide the driver-output print files to printing devices to allow the printing devices to print the different printable items.

The methods herein also use the print drivers to automatically record identifications (IDs) of the computerized devices and applications that provided the different printable items to the print drivers. The print-ready format files output by print drivers to printing engines/controllers are devoid of the IDs of the computerized devices and applications that provided the different printable items to the print driver, making it impossible for any of the engines/controllers to track analytics related to such computerized devices and applications. The methods herein automatically send the IDs of the computerized devices and applications that provided the different printable items to an analytics engine.

In addition, such methods can automatically provide a text entry field for capturing user comments through the print drivers. The methods herein can then automatically send the user comments the analytics engine and/or automatically post the user comments to at least one blog. A blog is a site (e.g., website) hosting related informational posts and the blog is accessible to the computerized devices over a wide area network (such as the Internet).

Also, such methods can use the print drivers to record additional information from the computerized devices and send such additional information to the analytics engine. The "additional information" can include, for example, vendor names corresponding to the applications, names and versions of operating systems running on the computerized devices, the time required to create the print-ready format files, characteristics of the printing devices, unused capabilities of the printing devices, etc.

Again, the print-ready format files are devoid of such "additional information" and devoid of the identifications of the computerized devices and applications providing the different printable items to the print driver, making it impossible for any of the printing systems that handle the print-ready format files (e.g., the print controller, the planning processor, all pre-press operations, all printing operations, all post-press operations, all finishing operations, etc.) to track such "additional information."

The methods herein automatically produce metrics based on the additional information and the IDs of the computerized devices and applications used to generate the different printable items using the analytics engine. In addition, such methods can automatically predict demand for printing-related devices, printing-related supplies, and/or printing-related services at printing device fleet levels, enterprise-wide levels, national levels, and/or world-wide levels. Such predictions can be made using the analytics engine and can be based on such metrics.

Various system embodiments herein use an analytics engine device, and at least one computerized device operatively (meaning directly or indirectly) connected to the analytics engine device. Each of the computerized devices includes a print driver, a processor operatively connected to the print driver, an input/output device operatively connected to the processor, etc. The processor is also operatively connected to a printing engine and the analytics engine device.

The processor receives an instruction to print a printable item and activates the print driver in response. The print driver automatically records identifications of the computerized device and an application providing the printable item to the print driver. The print driver automatically processes the printable item into a print-ready format to produce a driver-output print file. The input/output device automatically provides the driver-output print file from the print driver to a printing device to cause the printing device to print the printable item. The input/output device also automatically sends the identifications of the computerized device and an application providing the printable item to the analytics engine device. The analytics engine device then automatically produces metrics based on the IDs of computerized devices and applications used to generate the different printable items and the "additional information" mentioned above (using data from a plurality of print drivers).

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

As mentioned above, several pieces of printing data such as application type and version, operating system and version, format conversion time, device the document originated from, etc., are available for captured for analytics purposes, but may not be captured. This occurs because print drivers only include data necessary to allow the printing device to perform the printing process in the print files that are output. Print files are output by the print drivers in portable document format (PDF) or PostScript, and such files do not identify anything about the device that created the PDF or PostScript file.

The systems and methods herein capture analytics data at the print driver level (and such data is usually not captured either by the application or the printer), and send such information to an analytics engine that in turn compiles the data into useful information at a larger level (e.g., fleet, print shop, enterprise of print shops, national). Such transformed data or intelligence is further used for purposes such as pre-ordering, pricing negotiation, demand forecasting, improve user experience, etc.

Figure 1:
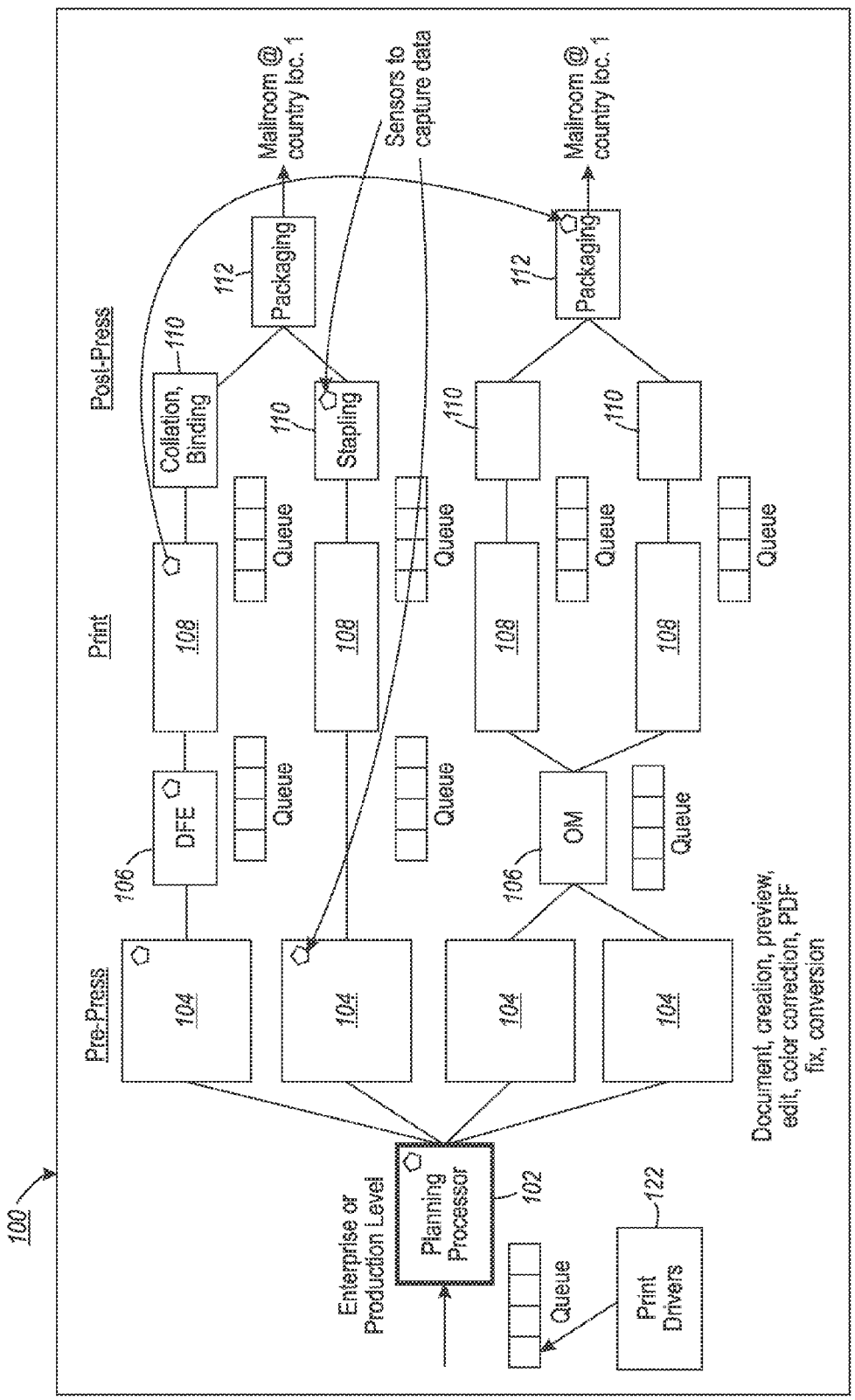
FIG. 1 is a schematic diagram illustrating a system herein.

Data that is useful to print systems (e.g., data for improving the print user experience) is captured at various points within a document workflow system (See FIG. 1). More specifically, FIG. 1 illustrates a system 100 that includes a planning processor 102, various pre-press processors 104, computerized devices used by the printing engines 106 (such as a digital front end (DFE); output manager (OM), etc.), various printing engines 108, various finishing devices 110, different packaging devices, 112, etc. Further, print drivers 122 output print-ready files (e.g., PDF, PostScript, etc.) to a queue that holds the print-ready files until they can be processed by an element of the system 100.

Figure 2:
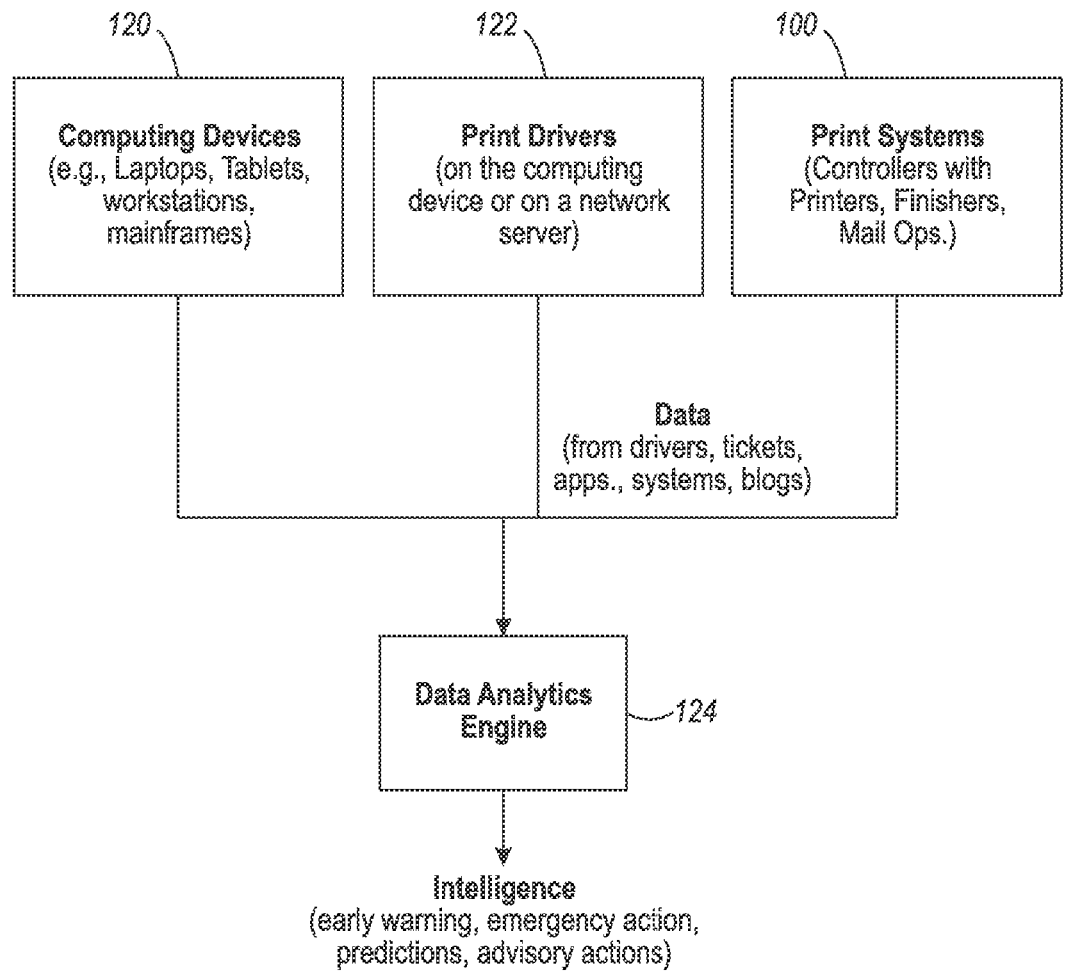
FIG. 2 is a flow diagram illustrating various methods herein.

Generally, as shown in FIG. 2, various computing devices that produce printable items use the print drivers 122 to supply the print systems 100 with print ready files. The data analytics engine 124 takes data from the print driver 122 and from the various sensors shown in the print systems 100 to generate useful metrics.

With systems and methods herein, the print drivers 122 capture information that is useful to print providers when the document is submitted for print. A subset of such metrics can include the name of the application that produced the printable item, its vendor, version, etc.; the computing device 120 the printable item is submitted from, the time taken to convert the entire document into a print ready format (in milliseconds), the operating system the print driver or application runs on, and a special text area to capture the print intent that could be posted to a blog. For example, text entries could be: "I need to print my e-book in color on such media with this kind of finishing, but such is not available in my driver options;" "I find it hard to find the color correction tab in this version of the print driver which I was able to do so easily in the prior version or from another vendor," etc.

Other metrics such as the number of pages, whether the pages are monochrome or color, which device is printed to, the devices characteristics, media selected for printing the job, etc., which are present in the print job ticket are also captured at the print driver 122. Additional items captured by the print driver 122 include what capabilities are actually used vs. what was desired, etc. Additional metrics can be captured at various stages by the print controller 106, the printer itself 108, finishing 110 and mail operations 112.

FIG. 1 uses round dots to represent sensors to illustrate how and where data can be captured (at various locations at the global level) in addition to the data captured by the print driver 122 for use by the data analytics engine 124. As shown, the data capture can be done both at production level (production printers) or at the enterprise level (office printers).

Figure 4:
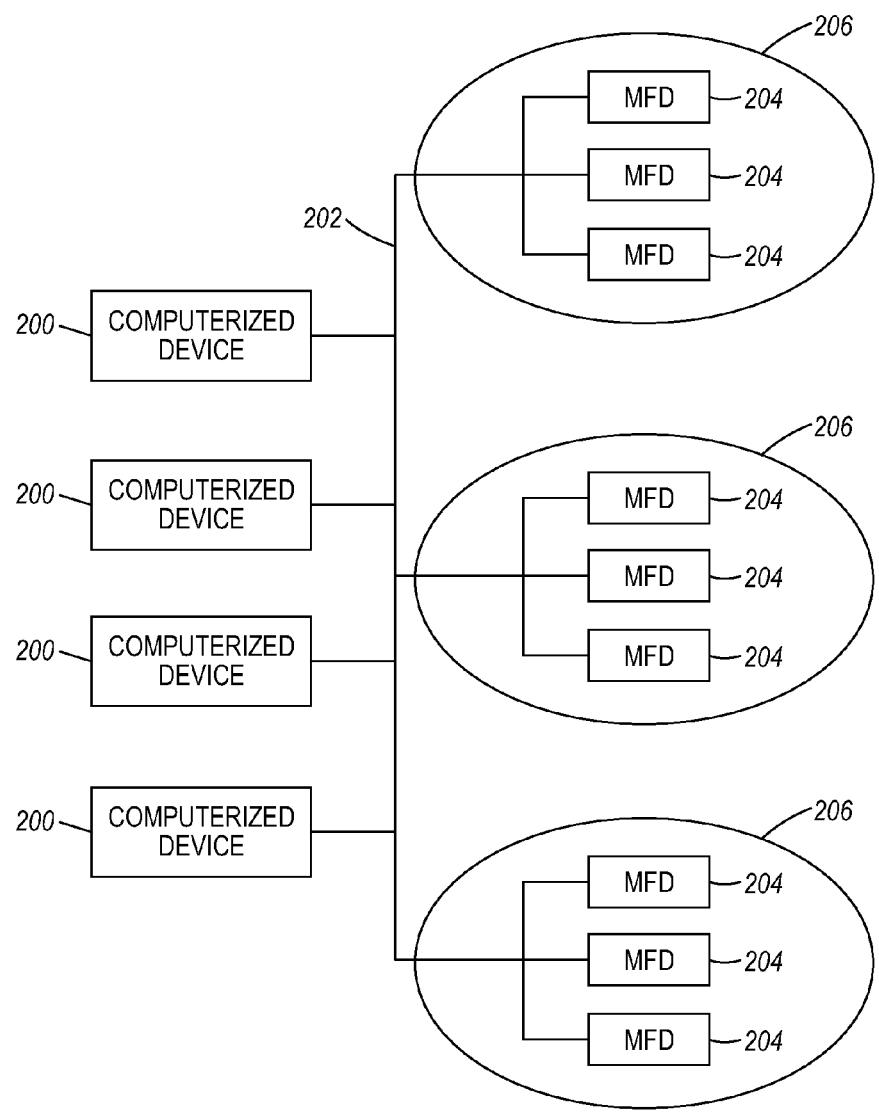
FIG. 4 is a schematic diagram illustrating systems herein.

As shown in FIG. 4 below, this data can be sent to a central server 200 where it can be stored and analyzed by the analytics engine 124. This helps in estimating or predicting demand, finding improvements that need to be made to the application (in case of an application that takes too much time to convert, etc.) and advising the print shop managers (at the fleet level) or global managers (in case of a multinational company having print shops at several sites distributed across the globe) to take the appropriate steps much in advance, thus helping them in proper planning and execution.

Further, the print driver 122 can provide a special free-form text area to capture the print intent (or complaints) that could be posted to a blog or helpdesk. The analytics system 124 thus provides a helpful solution to questions posted within blog sections (e.g., if you want to print N-up a browser's print driver, select "Print Using System Dialog"), or even helps improve the design of a print driver so as to allow a user to select an orientation (portrait or landscape) even in N-up mode. The end user advisory information can be posted back to blogs or social networking sites (or even enterprise wide networking media that communicates with customer support engineers, developers, etc.) for improved user experience. Other confidential information can be sent to the decision authorities.

In an alternative, the print drivers 122 can send data collected to a print server or controller 200 (e.g., an output manager that controls a fleet of devices) which then sends the data to analytics system 124. This is particularly useful when a print driver cannot send data (either due to security policy or due to configuration difficulties) to a data analytics engine directly.

Thus, the systems and methods herein give a clear picture of the demand (and supply) situation at the national or global level of consumables and service needed (hence hiring and deployment of service personnel). Further, such systems and methods give a clear picture to the product planners as to what devices, applications, and operating systems are using which printers at a global level. This allows designers to focus and fine tune drivers (e.g., improving time to print ready format) and controllers to those applications and devices, improving their feature level (basic to feature heavy information obtained through the blogs), usage (user experience, also information obtained through the blogs), and error free job submission.

Certain devices like smart phones and tablets may not have a sophisticated printer driver installed on them, instead they may use the print driver on a server (e.g., a server that has a print sub-system or print spooler) that enables the capture of information that otherwise cannot be captured by the device/application combination.

Figure 3:
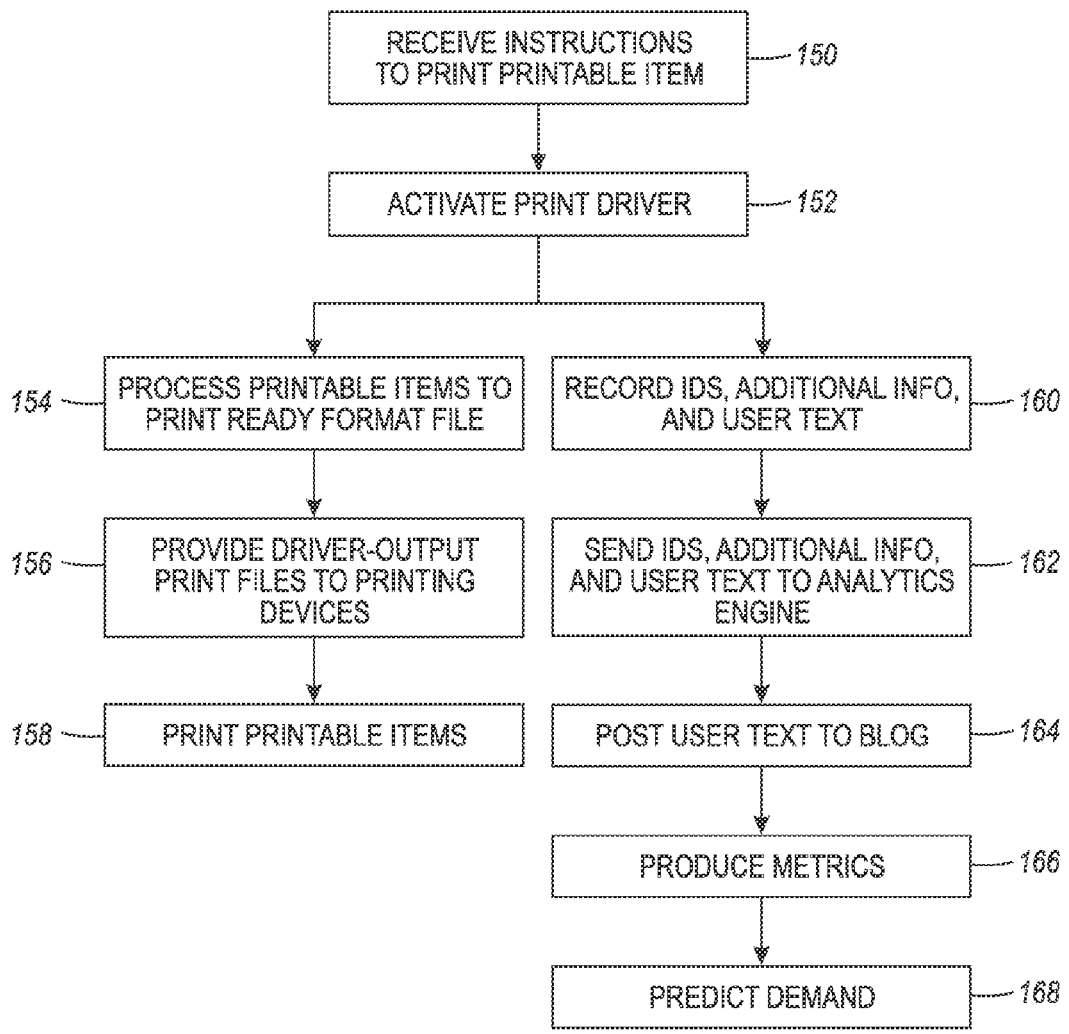
FIG. 3 is a flow diagram illustrating various methods herein.

FIG. 3 is flowchart illustrating exemplary methods herein. In item 150, these methods begin by receiving, into one or more computerized devices, instructions to print one or more different printable items. The methods herein then automatically activate one or more print drivers on the computerized devices in item 152 in response to the instructions to print the different printable items. In item 154, these methods automatically process the different printable items into print-ready format files using the print driver and, in item 156, automatically provide the driver-output print files to printing devices to allow the printing devices to print the different printable items (item 158).

The methods herein also use the print drivers to automatically record identifications (IDs) of the computerized devices and applications that provided the different printable items to the print drivers in item 160. The print-ready format files output by print drivers to printing engines/controllers in item 156 are devoid of the IDs of the computerized devices and applications that provided the different printable items to the print driver, making it impossible for any of the engines/controllers to track analytics related to such computerized devices and applications.

Also, such methods can use the print drivers to record additional information from the computerized devices in item 160. Such "additional information" can include, for example, vendor names corresponding to the applications, names and versions of operating systems running on the computerized devices, the time required to create the print-ready format files, characteristics of the printing devices, unused capabilities of the printing devices, etc. Similarly, the print-ready format files produced in item 156 are devoid of such "additional information."

Thus, conventional print-ready format files that could be produced in item 156 are devoid of such "additional information" and devoid of the IDs of the computerized devices and applications providing the different printable items to the print driver (that are recorded in item 160), making it impossible for conventional printing systems that handle the print-ready format files 156 (e.g., the print controller, the planning processor, all pre-press operations, all printing operations, all post-press operations, all finishing operations, etc.) to track the metrics that are tracked herein. As shown in item 162, the methods herein automatically send the IDs of the computerized devices and applications and the additional information to the analytics engine.

In addition, as shown in item 160, such method can automatically provide a text entry field for capturing user comments through the print drivers. The methods herein can then automatically send the user comments the analytics engine and/or automatically post the user comments to at least one blog 164. A blog is a site (e.g., website) hosting related informational posts and the blog is accessible to the computerized devices over a wide area network (such as the Internet).

In item 166, the methods herein automatically producing metrics based on the additional information and the IDs of the computerized devices and applications used to generate the different printable items using the analytics engine. In addition, in item 168, such methods can automatically predict demand for printing-related devices, printing-related supplies, and/or printing-related services at printing device fleet levels, enterprise-wide levels, national levels, and/or worldwide levels. Such predictions 168 can be made using the analytics engine and can be based on such metrics.

As shown in FIG. 4, exemplary system systems and methods herein include various computerized devices 200, 204 located at various different physical locations 206. The computerized devices 200, 204 can include print servers, printing devices, personal computers, etc., and are in communication (operatively connected to one another) by way of a local or wide area (wired or wireless) network 202.

Figure 5:
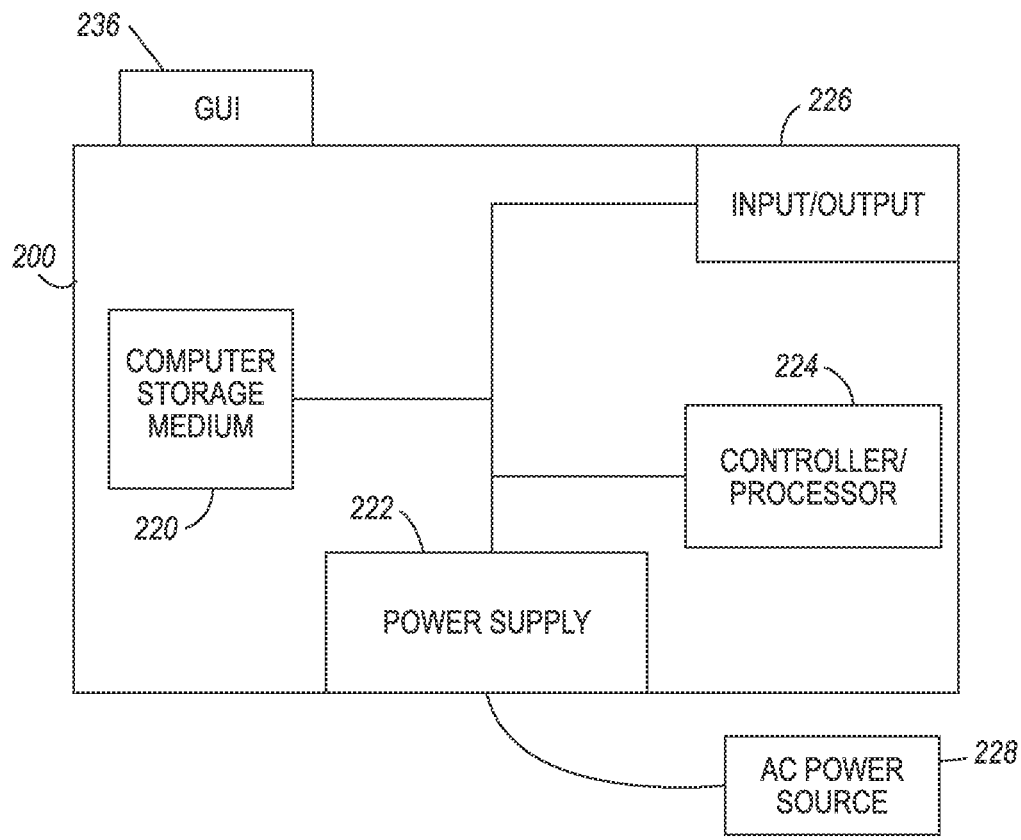
FIG. 5 is a schematic diagram illustrating devices herein.

FIG. 5 illustrates a computerized device 200, which can be used with systems and methods herein and can comprise, for example, a print server, a personal computer, a portable computing device, etc. The computerized device 200 includes a controller/processor 224 and a communications port (input/output) 226 operatively connected to the processor 224 and to the computerized network 202 external to the computerized device 200. Also, the computerized device 200 can include at least one accessory functional component, such as a graphic user interface assembly 236 that also operate on the power supplied from the external power source 228 (through the power supply 222).

The input/output device 226 is used for communications to and from the computerized device 200. The processor 224 controls the various actions of the computerized device. A non-transitory computer storage medium device 220 (which can be optical, magnetic, capacitor based, etc.) is readable by the processor 224 and stores instructions that the processor 224 executes to allow the computerized device to perform its various functions, such as those described herein. Thus, as shown in FIG. 5, a body housing 200 has one or more functional components that operate on power supplied from the alternating current (AC) 228 by the power supply 222. The power supply 222 can comprise a power storage element (e.g., a battery) and connects to an external alternating current power source 228 and converts the external power into the type of power needed by the various components.

Figure 6:
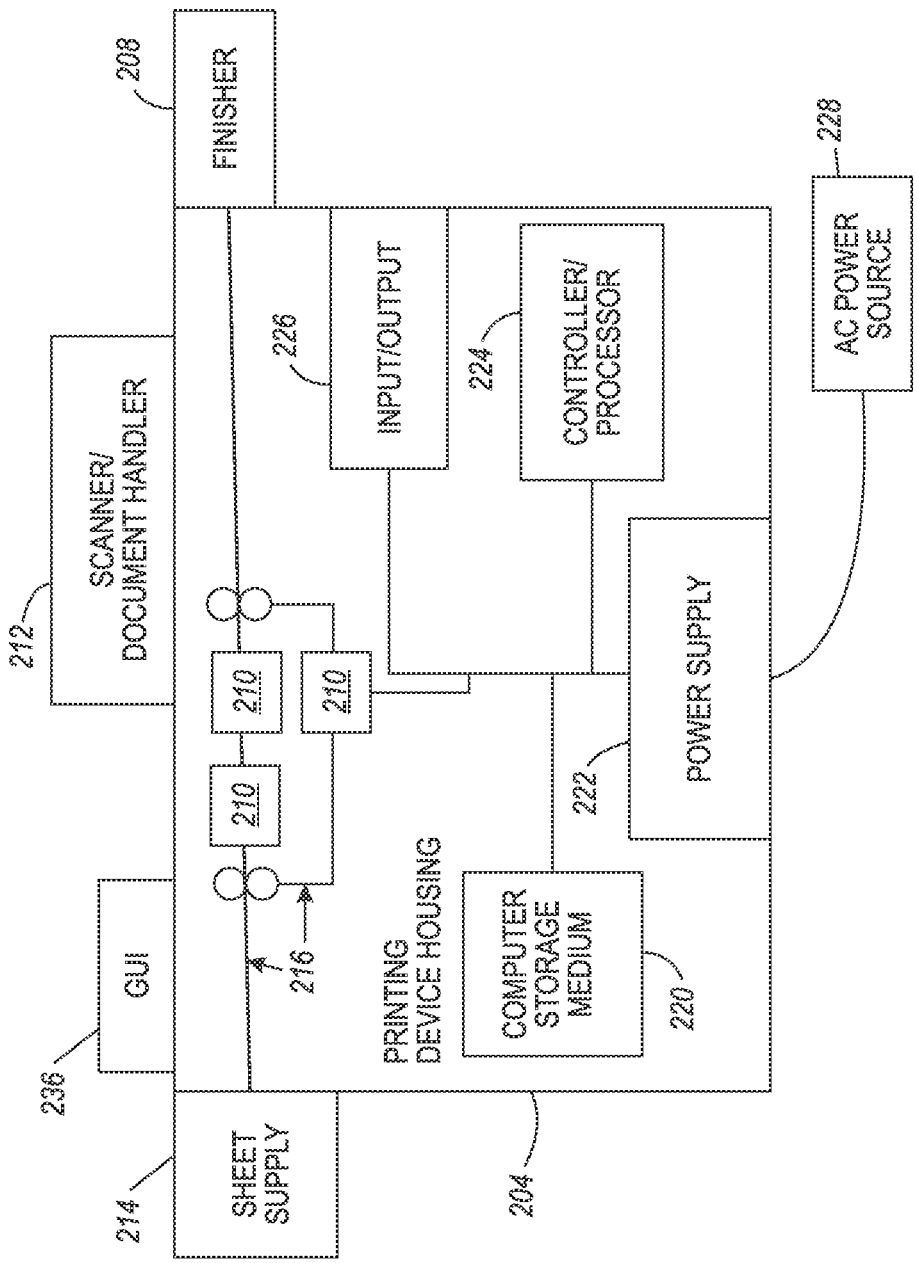
FIG. 6 is a schematic diagram illustrating devices herein.

FIG. 6 illustrates a computerized device that is a printing device 204, which can be used with systems and methods herein and can comprise, for example, a printer, copier, multi-function machine, multi-function device (MFD), etc. The printing device 204 includes many of the components mentioned above and at least one marking device (printing engines) 210 operatively connected to the processor 224, a media path 216 positioned to supply sheets of media from a sheet supply 214 to the marking device(s) 210, etc. After receiving various markings from the printing engine(s), the sheets of media can optionally pass to a finisher 208 which can fold, staple, sort, etc., the various printed sheets. Also, the printing device 204 can include at least one accessory functional component (such as a scanner/document handler 212, etc.) that also operate on the power supplied from the external power source 228 (through the power supply 222).

Thus, the various system embodiments herein use an analytics engine device 124, and at least one computerized device 200 operatively (meaning directly or indirectly) connected to the analytics engine device. Each of the computerized devices includes a print driver 122, a processor operatively connected to the print driver 122, an input/output device 226 operatively connected to the processor 224 224, etc. The processor 224 is also operatively connected to a printing engine and the analytics engine device.

The processor 224 receives an instruction to print a printable item and activates the print driver 122 in response. The print driver 122 automatically records identifications of the computerized device 120 and an application providing the printable item to the print driver 122. The print driver 122 automatically processes the printable item into a print-ready format to produce a driver-output print file 156. The input/output device 226 automatically provides the driver-output print file 156 from the print driver 122 to a printing device 204 to cause the printing device 204 to print the printable item. The input/output device 226 also automatically sends the identifications of the computerized device and an application providing the printable item to the analytics engine device 124. The analytics engine device 124 then automatically produces metrics based on the IDs of computerized devices and applications used to generate the different printable items and the "additional information" mentioned above (using data from a plurality of print drivers 122).

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the systems and methods described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A method comprising:
   receiving, into computerized device, instructions to print a printable item;
   automatically activating a print driver on said computerized device in response to said instructions to print said printable item;
   automatically recording, by said print driver, identifications of said computerized device, an application providing said printable item to said print driver, and additional information, said additional information comprising a vendor name corresponding to said application, a name and version of an operating system running on said computerized device, time required to create a driver-output print file, characteristics of a printing device, and unused capabilities of said printing device;
   automatically processing said printable item into a print-ready format to produce said driver-output print file, using said print driver;
   automatically providing said driver-output print file from said print driver to said printing device;
   automatically causing said printing device to print said printable item;
   automatically sending, from said print driver to an analytics engine, said identifications of said computerized device, said application providing said printable item, and said additional information;
   automatically producing metrics based on said identifications of said computerized device and said application providing said printable item using said analytics engine, said metrics comprising a name and version of said application providing said printable item and time taken to process said printable item into said print-ready format.

2. The method according to claim 1, further comprising:
   automatically providing, through said print driver, a text entry field for capturing user comments; and
   automatically sending said user comments to said analytics engine.

3. The method according to claim 2, further comprising automatically posting said user comments to at least one blog, said blog comprising a site hosting related informational posts and being accessible to said computerized device over a wide area network.

4. The method according to claim 1, said driver-output print file being devoid of said additional information and devoid of said identifications of said computerized device and application providing said printable item to said print driver.

5. The method according to claim 1, further comprising automatically predicting, based on said metrics, using said analytics engine, demand for at least one of printing-related device, printing-related supplies, and printing-related services at: at least one of printing device fleet levels, enterprise-wide levels, national levels, and world-wide levels.

6. A method comprising:
   receiving, into computerized devices, instructions to print different printable items;
   automatically activating print drivers on said computerized devices in response to said instructions to print said different printable items;
   automatically recording, by said print drivers, identifications of said computerized devices, applications providing said different printable items to said print drivers, and additional information, said additional information comprising a vendor name corresponding to said application, a name and version of an operating system running on said computerized device, time required to create driver-output print files, characteristics of printing devices, and unused capabilities of said printing device;
   automatically processing said different printable items into a print-ready format to produce said driver-output print files using said print drivers;
   automatically providing said driver-output print files from said print drivers to said printing devices;
   automatically causing said printing devices to print said different printable items;
   automatically sending, from said print drivers to an analytics engine, said identifications of said computerized devices, applications providing said different printable items, and said additional information; and
   automatically producing metrics based on said identifications of said computerized devices and said applications providing said different printable items using said analytics engine, said metrics comprising a name and version of said applications providing said different printable items and time taken to process said different printable items into said print-ready format.

7. The method according to claim 6, further comprising:
   automatically providing, through said print drivers, a text entry field for capturing user comments; and
   automatically sending said user comments to said analytics engine.

8. The method according to claim 7, further comprising automatically posting said user comments to at least one blog, said blog comprising a site hosting related informational posts and being accessible to said computerized devices over a wide area network.

9. The method according to claim 6, said driver-output print files being devoid of said additional information and devoid of said identifications of said computerized devices and applications providing said different printable items to said print driver.

10. The method according to claim 6, further comprising automatically predicting, based on said metrics, using said analytics engine, demand for at least one of printing-related devices, printing-related supplies, and printing-related services at: at least one of printing device fleet levels, enterprise-wide levels, national levels, and world-wide levels.

11. A computerized device comprising:
a print driver;
a processor operatively connected to said print driver; and
an input/output device operatively connected to said processor,
said processor being operatively connected to a printing engine and an analytics engine,
said processor receiving an instruction to print a printable item and activating said print driver in response to said instruction,
said print driver automatically recording identifications of said computerized device, an application providing said printable item to said print driver, and additional information, said additional information comprising a vendor name corresponding to said application, a name and version of an operating system running on said computerized device, time required to create a driver-output print file, characteristics of a printing device, and unused capabilities of said printing device,
said print driver automatically processing said printable item into a print-ready format to produce said driver-output print file,
said input/output device automatically providing said driver-output print file from said print driver to said printing device to cause said printing device to print said printable item,
said input/output device automatically sending, from said print driver to said analytics engine, said identifications of said computerized device, said application providing said printable item, and said additional information, and
said analytics engine automatically producing metrics based on said identifications of said computerized device and said application providing said printable item using data from said print driver, and
said metrics comprising a name and version of said application providing said printable item and time taken to process said printable item into said print-ready format.

12. The computerized device according to claim 11, said print driver providing a text entry field for capturing user comments, and said input/output device automatically sending said user comments to said analytics engine.

13. The computerized device according to claim 11, said processor automatically posting said user comments to at least one blog through said input/output device, and said blog comprising a site hosting related informational posts and being accessible to said computerized device over a wide area network.

14. The computerized device according to claim 11, said driver-output print file being devoid of said additional information and devoid of said identifications of said computerized device and application providing said printable item to said print driver.

15. The computerized device according to claim 11, said analytics engine automatically predicting, based on said metrics, demand for at least one of printing-related device, printing-related supplies, and printing-related services at: at least one of printing device fleet levels, enterprise-wide levels, national levels, and world-wide levels.

16. A system comprising:
an analytics engine device;
and at least one computerized device operatively connected to said analytics engine device, each said computerized device comprising:
a print driver;
a processor operatively connected to said print driver; and
an input/output device operatively connected to said processor,
said processor being operatively connected to a printing engine and said analytics engine device,
said processor receiving an instruction to print a printable item and activating said print driver in response to said instruction,
said print driver automatically recording identifications of said computerized device, an application providing said printable item to said print driver, and additional information, said additional information comprising a vendor name corresponding to said application, a name and version of an operating system running on said computerized device, time required to create a driver-output print file, characteristics of a printing device, and unused capabilities of said printing device,
said print driver automatically processing said printable item into a print-ready format to produce said driver-output print file,
said input/output device automatically providing said driver-output print file from said print driver to said printing device to cause said printing device to print said printable item,
said input/output device automatically sending, from said print driver to said analytics engine device, said identifications of said computerized device, said application providing said printable item, and said additional information, and
said analytics engine automatically producing metrics based on said identifications of said computerized device and said printable item using data from said print driver, and
said metrics comprising a name and version of said application providing said printable item and time taken to process said printable item into said print-ready format.

17. The system according to claim 16, said print driver providing a text entry field for capturing user comments, and said input/output device automatically sending said user comments to said analytics engine device.

18. The system according to claim 17, said processor automatically posting said user comments to at least one blog through said input/output device, and said blog comprising a site hosting related informational posts and being accessible to said computerized device over a wide area network.

19. The system according to claim 16, said driver-output print file being devoid of said additional information and devoid of said identifications of said computerized device and application providing said printable item to said print driver.

20. The system according to claim 16, said analytics engine device automatically predicting, based on said metrics, demand for at least one of printing-related device, printing-related supplies, and printing-related services at: at least one of printing device fleet levels, enterprise-wide levels, national levels, and world-wide levels.

* * * * *